United States Patent
Shi (10) Patent No.: US 6,475,378 B1
(45) Date of Patent: Nov. 5, 2002

(54) CARTRIDGE FILTER

(75) Inventor: Chi Wei Shi, Tao Yuan Hsien (TW)

(73) Assignee: Assoma Inc., Tao Yuan Hsien (TW)

( * ) Notice: Subject to any disclaimer, the term of this patent is extended or adjusted under 35 U.S.C. 154(b) by 0 days.

(21) Appl. No.: 09/705,115

(22) Filed: Nov. 1, 2000

(51) Int. Cl.$^7$ .............................................. B01D 35/34
(52) U.S. Cl. ........................ 210/90; 210/232; 210/250; 210/323.2; 210/416.1; 210/437; 210/450; 210/456
(58) Field of Search ......................... 210/90, 232, 250, 210/323.2, 435, 437, 450, 456, 457, 416.1

(56) References Cited

U.S. PATENT DOCUMENTS

| | | | | |
|---|---|---|---|---|
| 1,565,661 A | * | 12/1925 | Lomax | 210/416.1 |
| 3,291,310 A | * | 12/1966 | Marvel | 210/169 |
| 4,243,536 A | * | 1/1981 | Prolss | 210/321.1 |
| 4,402,828 A | * | 9/1983 | Edens | 210/323.2 |

* cited by examiner

Primary Examiner—Matthew O. Savage
(74) Attorney, Agent, or Firm—Pro-Techtor International Services (57) ABSTRACT

A cartridge filter includes a cartridge filter including an upper annular groove in an outer periphery thereof a top cover mounted to seal an open upper end of the cartridge filter, and a C-shape upper bracket mounted in the upper annular groove of the cartridge filter. A screw and a nut are provided for securing ends of the upper bracket together. The upper bracket includes a plurality of annular spaced pivot seats. A plurality of swivel studs are provided and each includes a first end pivotally attached to each pivot seat. Each swivel stud further includes a threaded second end and a handwheel threadedly engaged on the threaded second end for securing the top cover in place. The upper bracket further includes a flange extended radially outward for preventing deformation in the ends of the C-shape upper bracket and the pivot seats.

16 Claims, 11 Drawing Sheets

CARTRIDGE FILTER

BACKGROUND OF THE INVENTION

1. Field of the Invention

The present invention relates to a cartridge filter for preventing leakage of chemical solution in a filter container.

2. Description of the Related Art

Figure 10:
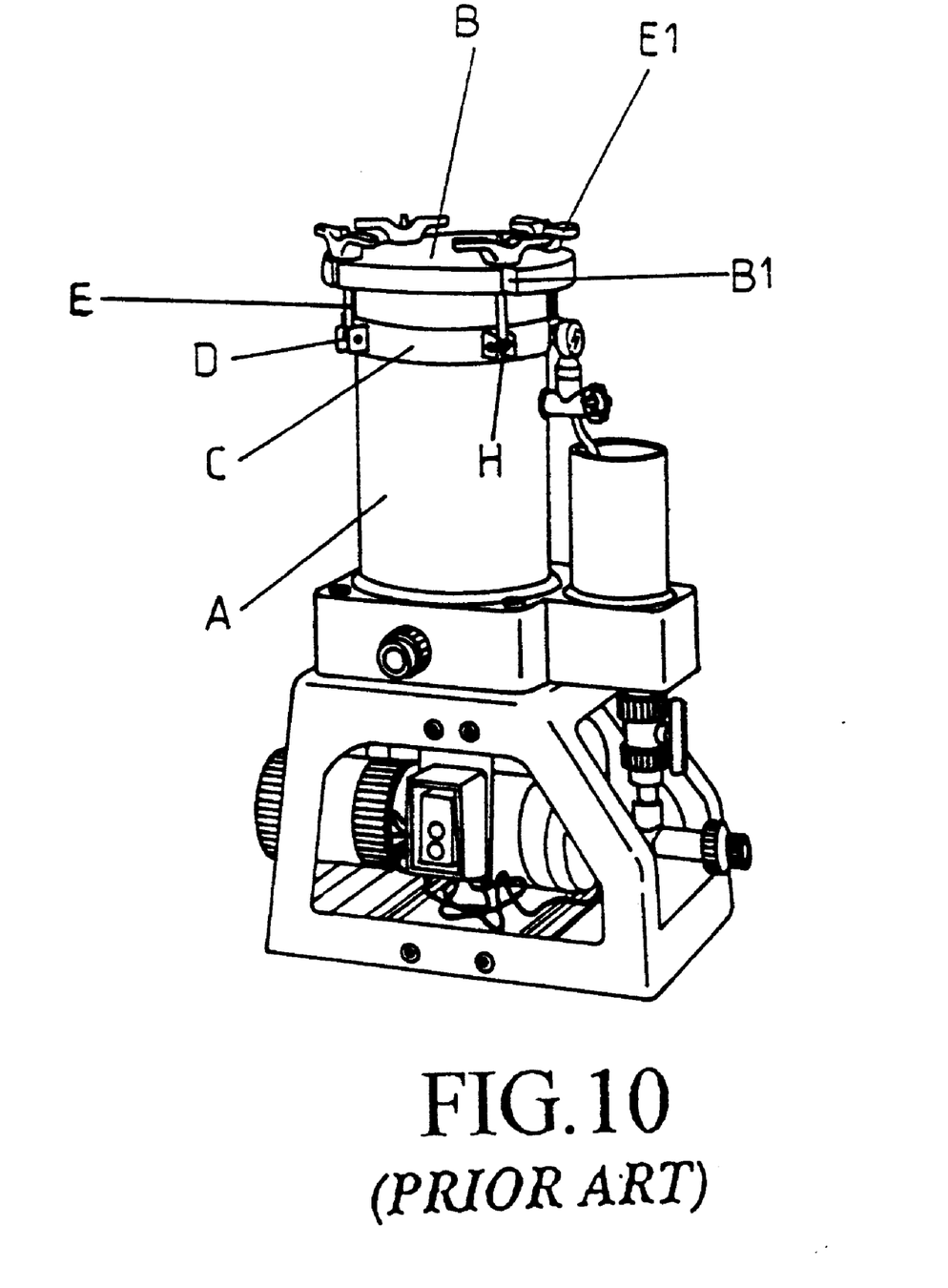
FIG. 10 is a perspective view of a conventional cartridge filter.
Figure 11:
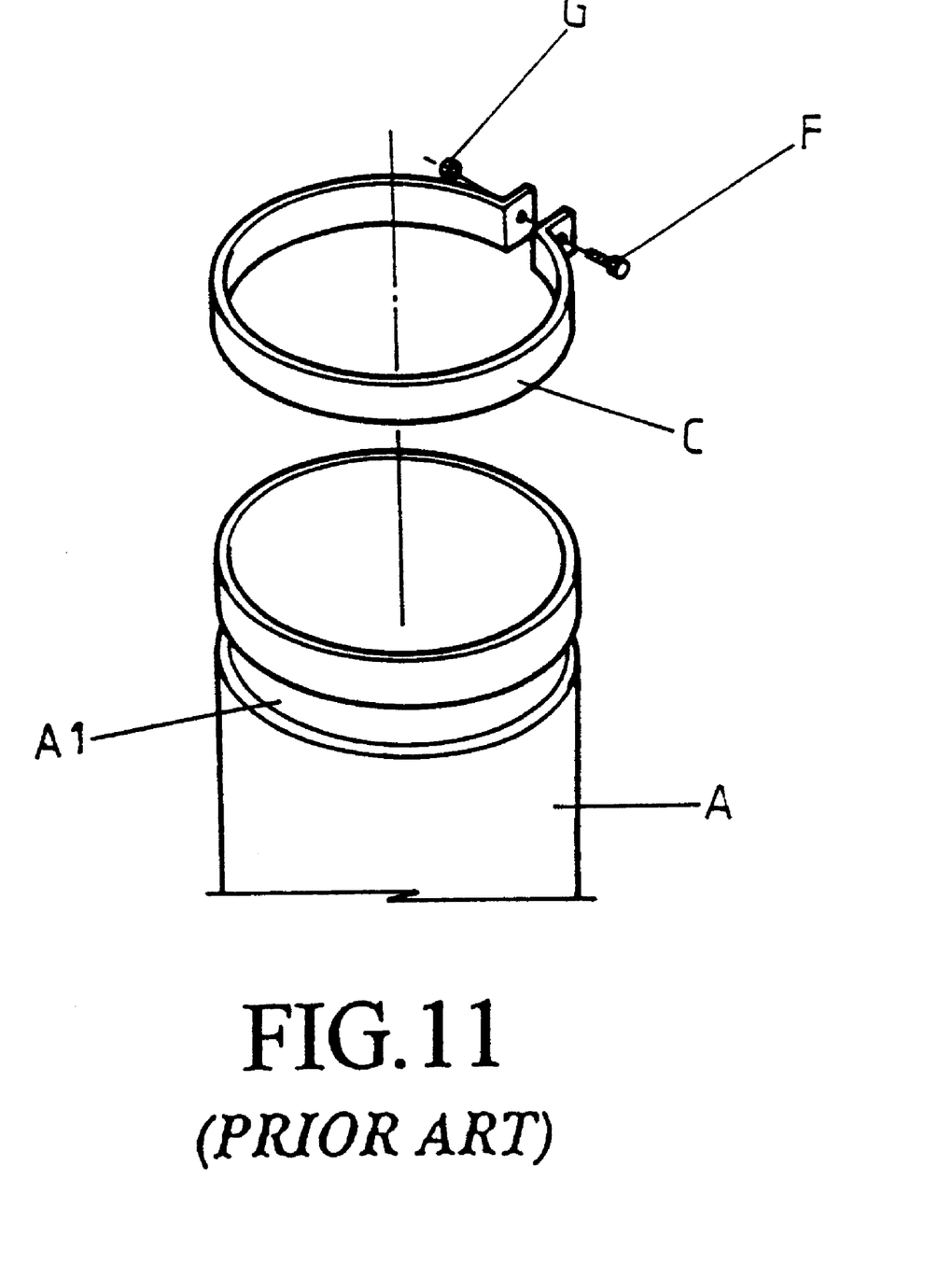
FIG. 11 is a schematic exploded perspective view illustrating a cartridge chamber and a bracket of the conventional cartridge filter.
Figure 12:
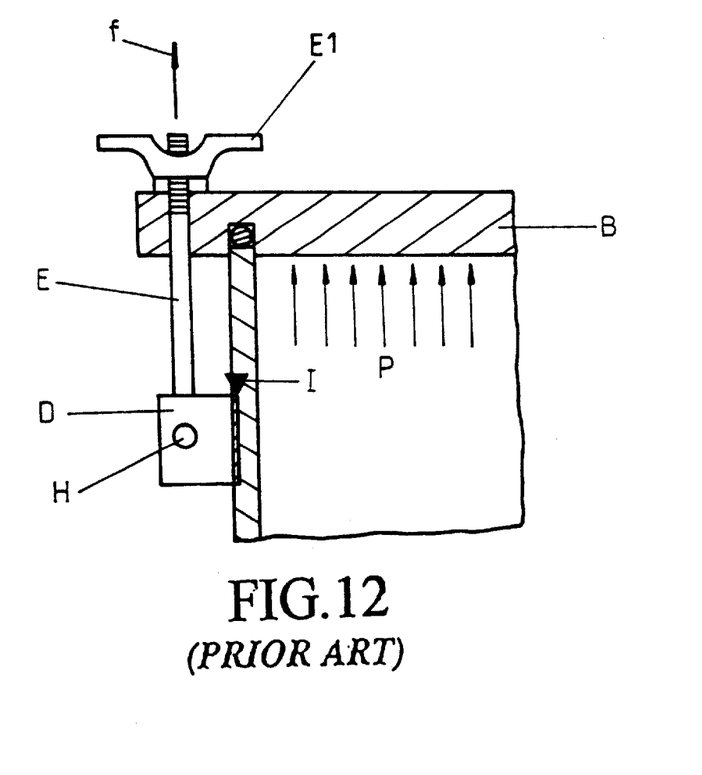
FIG. 12 is a schematic sectional view of an upper corner of the conventional cartridge filter.

FIG. 10 of the drawings illustrates a conventional cartridge filter comprising a filter chamber A for receiving corrosive chemical solution that may corrode metal parts. A top cover B is therefore required to seal the filter chamber A. As illustrated in FIGS. 10 and 11, the filter chamber A of the cartridge filter includes an annular groove A1 in the upper portion of an outer periphery there of for setting a C-shape metal upper bracket C. No bracket is provided to the lower portion of the filter chamber A. A screw F and a nut G are provided to secure two ends of the C-shape bracket C together to thereby clamp the filter chamber A. A plurality of annularly spaced U-shape pivot seat D are welded to the bracket C. Each pivot seat D provides a space for pivotally receiving an end of a swivel stud E by a screw H and a nut. Thus, each swivel stud E may pivot about an axis of the screw H. A handwheel E1 is threadedly engaged with a threaded upper portion of each swivel stud E, as shown in FIG. 12. The hand wheel E1 may be rotated to secure the top cover B in place. The top cover B includes a plurality of annularly spaced recesses B1 through which the swivel studs E extend, respectively.

Figure 13:
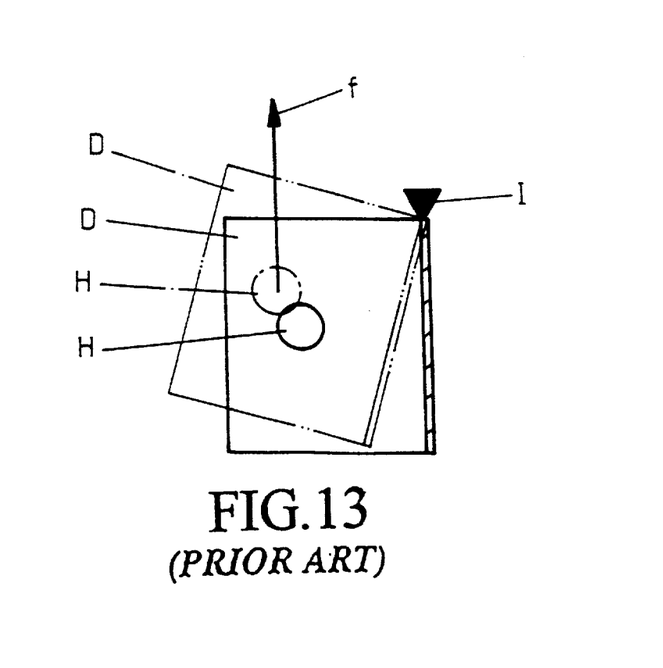
FIG. 13 is a schematic view illustrating movement of a pivot seat of the conventional cartridge filter.

Nevertheless, after a period of time, the pressure inside the sealed filter chamber A increases gradually as a result of blockage in the cartridge in the filter chamber A and continuous pumping operation of the pump. The filter chamber A and the top cover B are subjected to a considerable outward pressure P (FIG. 12) which would impact the top cover continuously and generate an upward force f that pulls each swivel stud E upward. Thus, the U-shape pivot seats D of the bracket C tend to deform about point 1 (FIG. 13) and the screws H are also displaced. This causes deformation of the C-clip C in the end portions. As a result, a gap is generated between the filter chamber A and the top cover B, and leakage occurs accordingly.

The present invention is intended to provide a cartridge filter that mitigates and/or obviates the above problems.

SUMMARY OF THE INVENTION

It is the primary object of the present invention to provide a cartridge filter that comprises a particular upper bracket that may prevent deformation in the two ends of the upper bracket and the pivot seats of the upper bracket when the upper bracket and the top cover are engaged with each other, thereby preventing leakage of chemical solution in the filter chamber.

It is another object of the present invention to provide a cartridge filter comprising an upper bracket and a lower bracket that are identical in structure except for that one of them is disposed upside-down relative the other. Thus, only one mold is required for manufacturing the upper bracket and the lower bracket.

It is a further object of the present invention to provide a cartridge filter comprising a dispersing tube in the filter chamber. Liquid from the inlet is uniformly dispersed into a plurality of cartridges in the filter chamber at a lower speed. Tilt and shaking of the cartridges resulting from impact by the liquid are avoided. A filtering bed can be formed easily to improve the filtering effect.

It is still another object of the present invention to provide a cartridge filter comprising a stable main frame for placing the filter chamber and a priming cup. The priming cup and a pressure gauge are placed to a rear of the cartridge filter opposite to the inlet of a pump, thereby providing convenient operation.

It is yet another object of the present invention to provide a cartridge filter comprising a pump seat having a plurality of transverse ribs to thereby define several sinks for draining chemical solution. The pump seat further includes T-shape legs on each of two lateral sides thereof to thereby support large weight. Deformation of the pump seat is less likely to occur even if the pump and a motor are placed on the pump seat for a long period of time.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
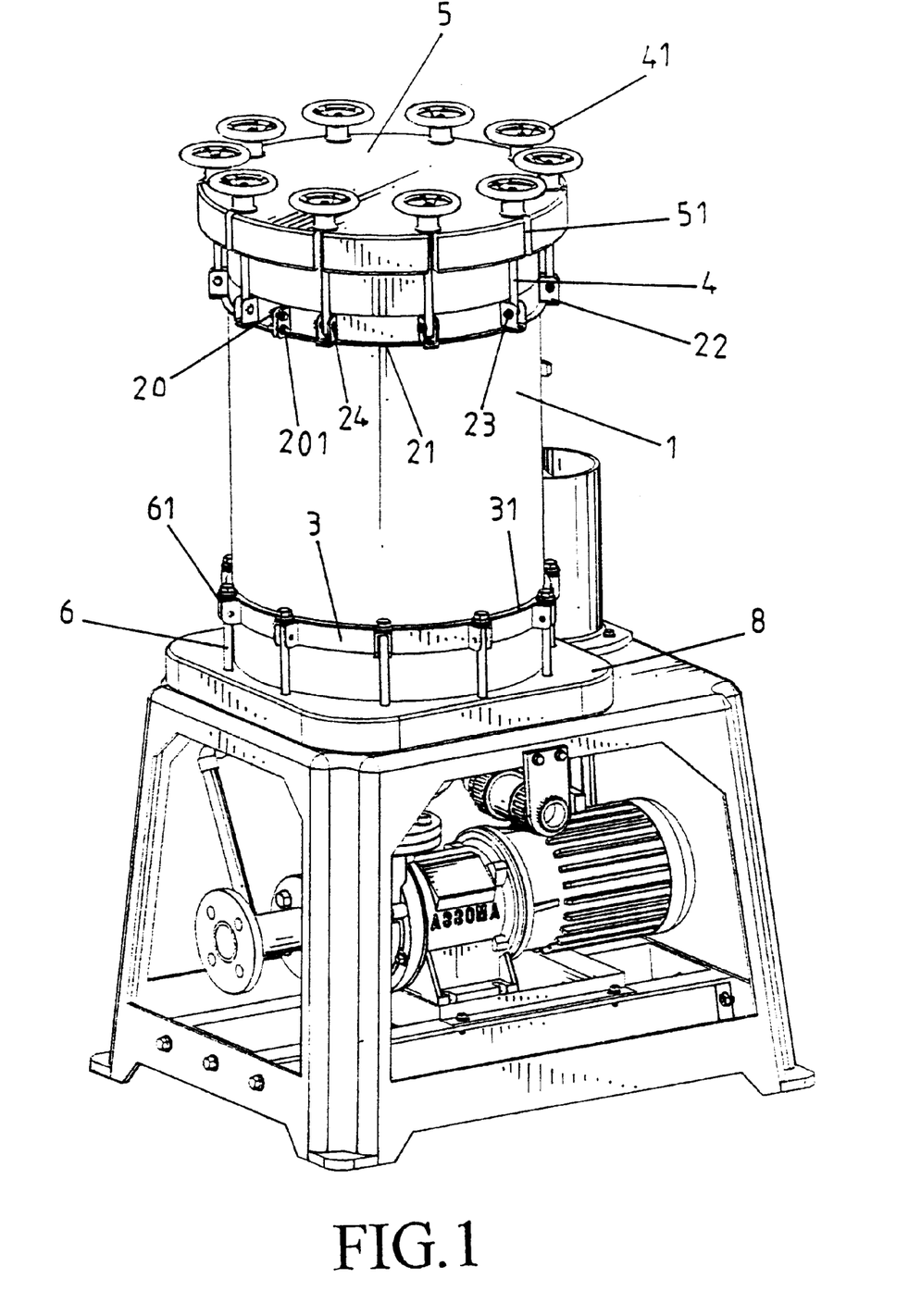
FIG. 1 is a perspective view of a cartridge filter in accordance with the present invention.
Figure 2:
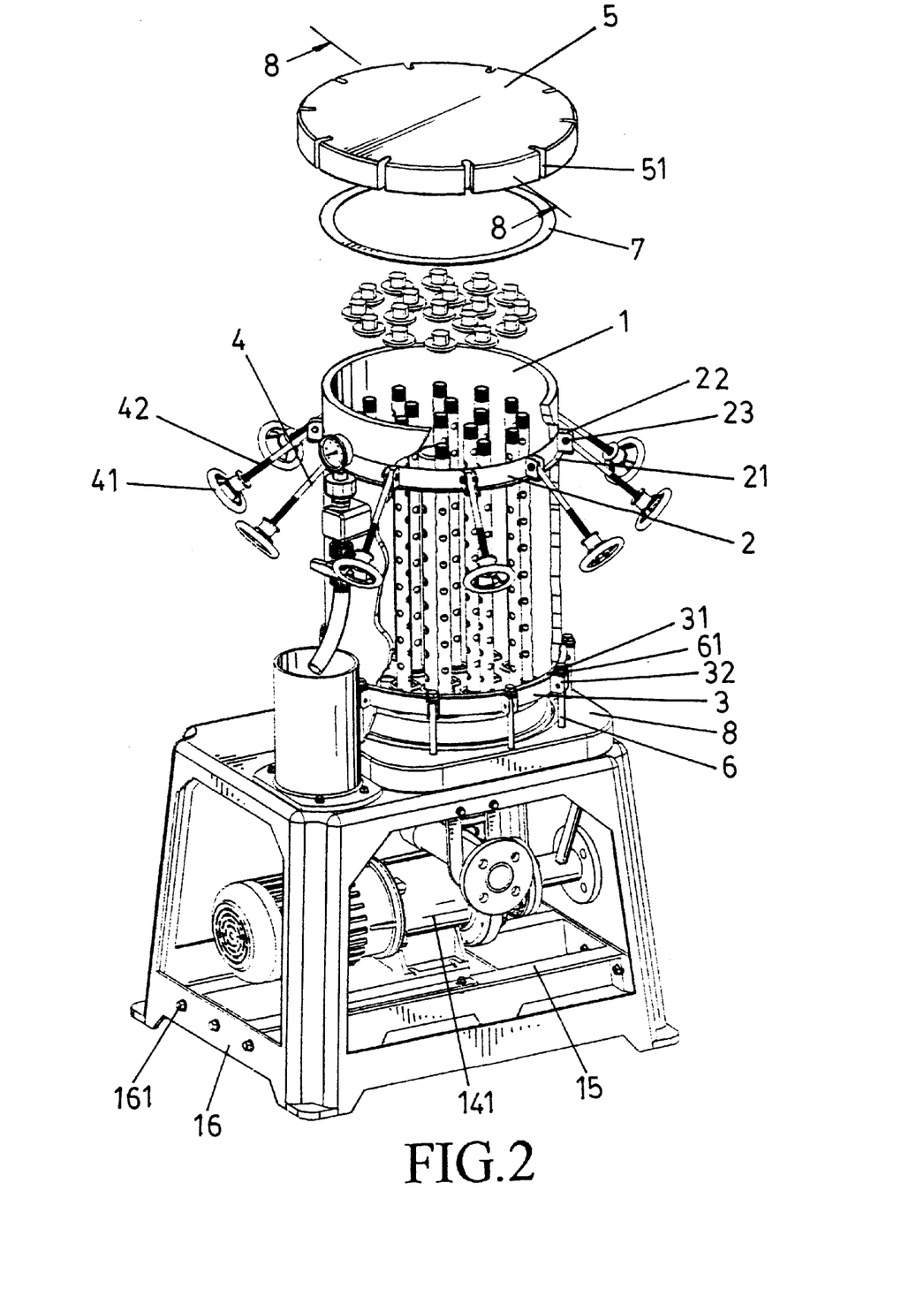
FIG. 2 is a perspective view, partly exploded and partly cutaway, of the cartridge filter in accordance with the present invention.

Referring to FIGS. 1 through 9 and initially to FIGS. 1 and 2, a cartridge filter in accordance with the present invention is used for conveying and filtering chemical solutions, like conventional ones. The cartridge filter in accordance with the present invention includes a filter chamber 1 for containing chemical solution that is strongly corrosive to metal parts. A top cover 5 is provided to seal the filter chamber 1. The filter chamber 1 of the cartridge filter includes an annular groove (not shown) in an upper portion of an outer periphery thereof for setting a C-shape metal upper bracket 2. Similarly, the filter chamber 1 of the cartridge filter includes an annular groove (not shown) in a lower portion of the outer periphery thereof for setting a C-shape metal lower bracket 3. Two ends of each C-shape bracket 2, 3 are secured together by a screw 20 and a nut 201 (FIG. 1).

Figure 4:
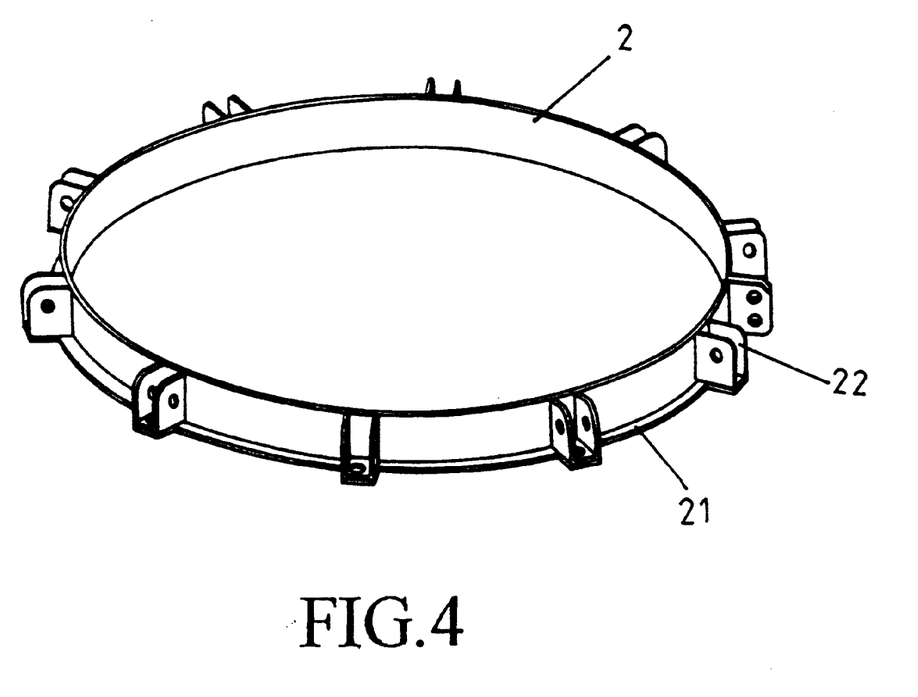
FIG. 4 is a perspective view of an upper bracket of the cartridge filter in accordance with the present invention.
Figures 8, 9:
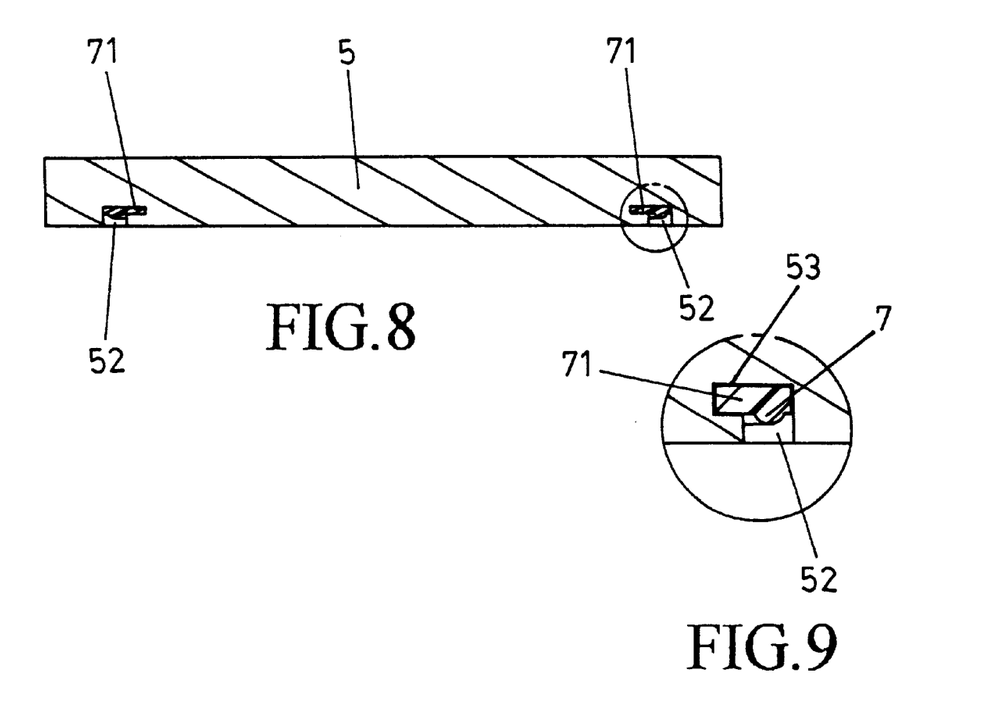
FIG. 8 is a sectional view taken along line 8—8 in FIG. 2.
FIG. 9 is an enlarged view of a circle in FIG. 8.

Referring to FIGS. 1, 2, and 4, a plurality of annularly spaced U-shape pivot seat 22 are welded to the upper bracket 2. Each pivot seat 22 provides a space for pivotally setting an end of a swivel stud 4 by a screw 23 and a nut 24 (FIG. 1). Thus, each swivel stud 4 may pivot about an axis of the screw 23. A handwheel 41 is threadedly engaged with a threaded portion 42 of each swivel stud 4. The handwheel 41 may be rotated to secure the top cover 5 in place. The top cover 5 includes a plurality of annularly spaced recesses 51. Each swivel stud 4 is pivotable between a release position shown in FIG. 2 and a locking position shown in FIG. 1. Each swivel stud 4 in the locking position is extended through an associated recess 51 in the top cover 5, and the handwheels 41 are turned to secure the top cover 5 in place, thereby providing required sealing effect. Referring to FIGS. 2 and 8, the top cover 5 includes an inner annular groove 52 for setting an annular gasket 7 for sealing purpose. The annular groove 52 extends radially inward to form an annular groove extension 53 for fittingly setting an annular protrusion 71 of the annular gasket 7. The annular protrusion 71 of the annular gasket 7 is manually inserted into the annular groove extension 53 to prevent disengagement of the gasket 7, best shown in FIG. 9. No glue is required.

Referring to FIGS. 2 and 4, the upper bracket 2 includes a flange 21 extended radially outward from a lower end edge of an outer periphery thereof. The lower bracket 3 has a structure identical to that of the upper bracket 2 except that the lower bracket 3 has a flange 31 extended radially outward from an upper end edge of an outer periphery thereof. Namely, the lower bracket 3 can be used as the upper bracket 2 by means of turning the former upside-down, and vice versa. When the chemical solution in the filter chamber 1 impacts on the wall of the filter chamber 1, the flange 21 may resist torque acting on the U-shape upper bracket 2. The flange 21 also prevents deformation in the joint of the two ends of the C-shape upper bracket 2, especially the screw 20 and nut 201. Thus, leakage problem of the cartridge filter is avoided.

Since the upper bracket 2 and the lower bracket 3 have identical structures, only one mold is enough. The manufacture cost is reduced and the competitive capacity is thus improved. A plurality of positioning studs 6 are provided and each of which is passed through a metal gasket 61 and extended through a bracket seat 32 for the lower bracket 3 and then secured to a base plate 8.

Figure 3:
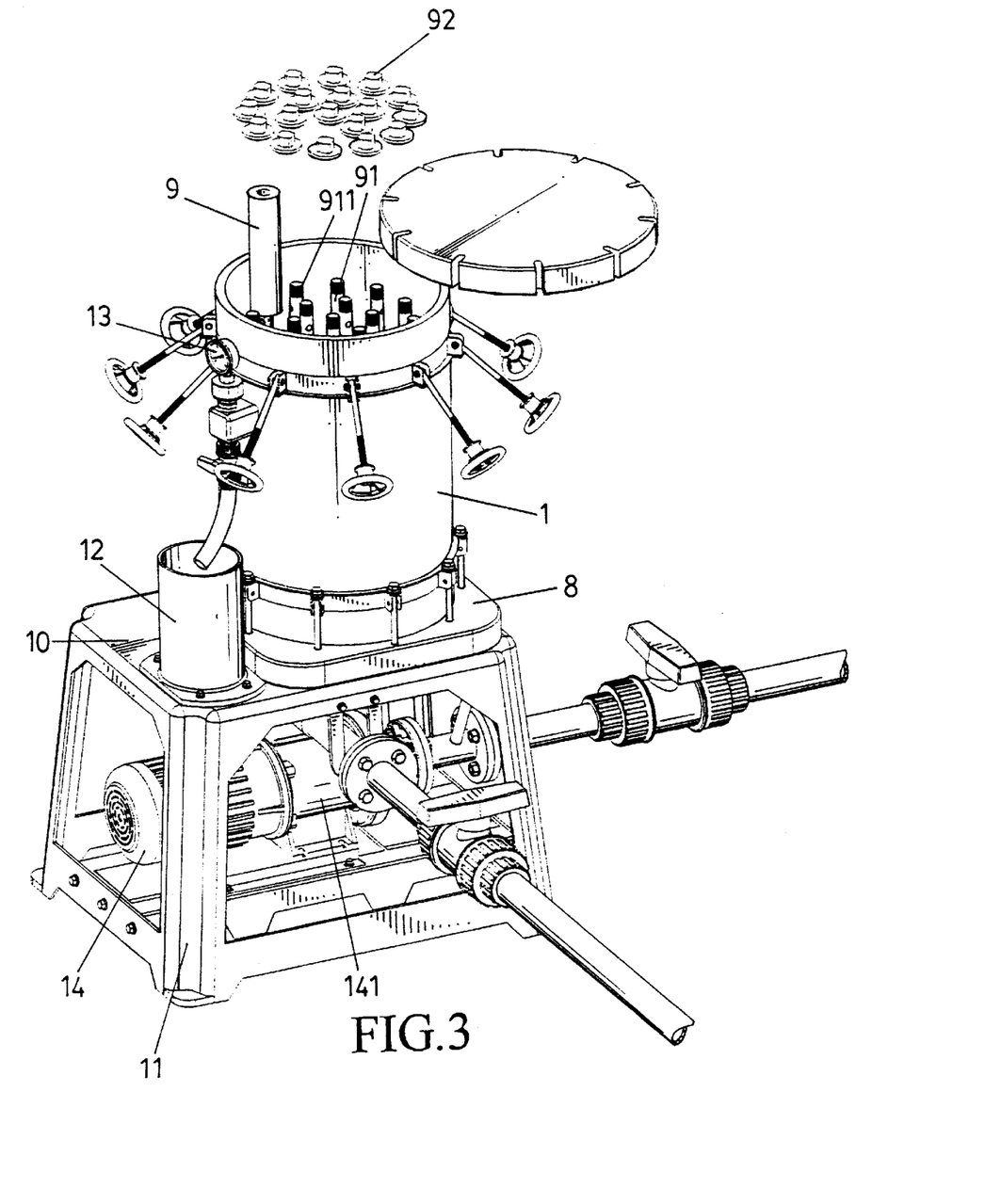
FIG. 3 is a perspective view, partly exploded, of the cartridge filter in accordance with the present invention.
Figure 5:
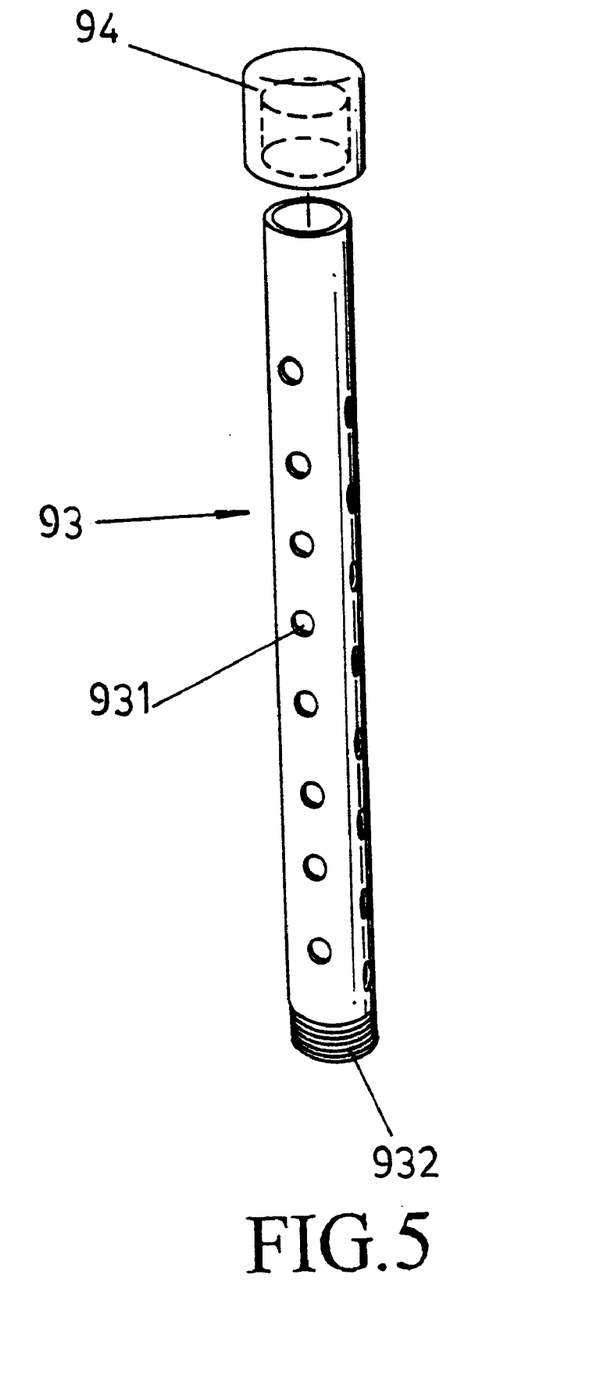
FIG. 5 is an exploded perspective view of a dispersing tube of the cartridge filter in accordance with the present invention.
Figure 6:
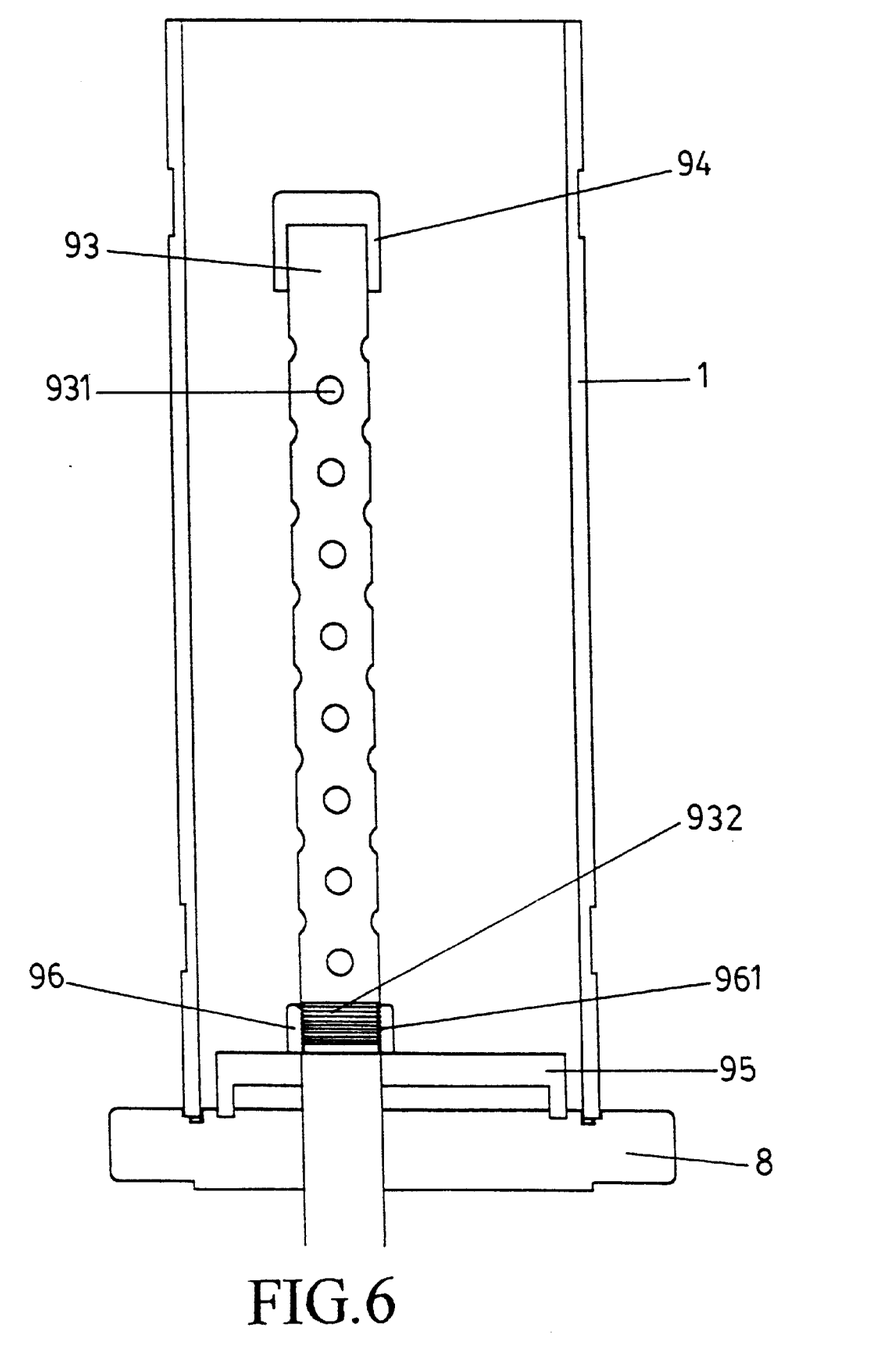
FIG. 6 is a schematic sectional view of the cartridge filter in accordance with the present invention.

Referring to FIG. 3, a plurality of cartridge core pipes 91 is mounted in the filter chamber 1 with a hollow cartridge 9 mounted around each cartridge core pipe 91. Each cartridge core pipe 91 includes a threaded lower end that is secured to a separation plate 95 (FIG. 6) mounted to a bottom of the filter chamber 1. A cartridge fastener 92 is threadedly engaged with a threaded upper end 911 of each cartridge core pipe 91 for securing each cartridge 9 to an associated cartridge core pipe 9. Referring to FIGS. 2, 3, 5, and 6, a dispersing tube 93 is mounted in the filter chamber 1. The dispersing tube 93 is communicated with a liquid inlet (not shown). As illustrated in FIG. 5, the dispersing tube 93 includes a plurality of dispersing holes 93 in an outer periphery thereof and a threaded lower end 932 that is threadedly engaged with a screw hole 961 of the seat 96, which, in turn, is welded to the separation plate 95 located above the base plate 8, as shown in FIG. 6. Thus, the dispersing tube 93 is secured in the filter chamber 1. A tube cap 94 is mounted to seal an open upper end (not labeled) of the dispersing tube 93, as shown in FIGS. 5 and 6. Thus, liquid entering the dispersing tube 93 is reduced its speed before it enters the filter chamber 1. Vigorous impact that may cause damage to the cartridges 9 and the cartridge core pipes 91 is avoided. In addition, a filtering bed can be formed easily for increasing the filtering effect and filtering precision.

The main frame 10 is substantially rectangular and includes four legs 11 that are inclined toward each other to provide a stable support and to increase the strength. Each leg 11 has a lower end locating on the ground. The base plate 8 is mounted on top of the main frame 10 and the filter chamber 1 is mounted on top of the base plate 8. In addition, a priming cup 12 is also mounted on top of the main frame 10. The priming cup 12 is placed in a position opposite to the inlet for the pump 141. A pressure gauge 13 (FIG. 3) is provided adjacent to the priming cup 12 for monitoring. Thus, an operator may work on a rear aisle behind the cartridge filter that is away from frames and pipes located adjacent to the inlet of the pump 141. When the operator checks, e.g., whether the impeller (not shown) malfunction, he/she may stand on the rear aisle and pull the motor 14 outward without moving the pipes adjacent to the inlet of the pump 14. If necessary, a flange for the pipes is detached, yet it is still very easy. The motor 14 and the pump 141 are shielded by the main frame 10 and thus prevented from being splashed by the corrosive chemical solution during replacement of cartridges 9.

Figure 7:
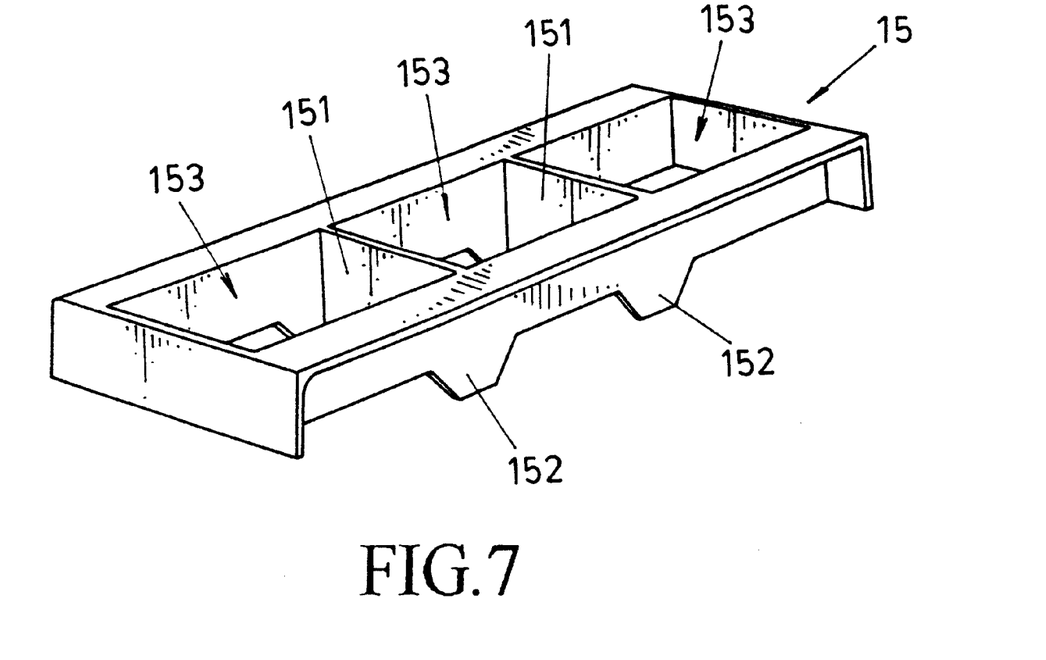
FIG. 7 is a perspective view of a pump seat of the cartridge filter in accordance with the present invention.

Referring to FIGS. 2 and 7, a pump skid 15 is mounted to a lower portion of the main frame 10 for supporting the pump 141. As illustrated in FIG. 7, the pump skid 15 includes a plurality of transverse ribs 151 to thereby define a plurality of partitions or sinks 153. Furthermore, a plurality of substantially T-shape legs 152 are provided to each of two lateral sides of the pump skid 15. The pump skid 15 is also shielded by the main frame 10. Bolts 161 are provided to fix the pump skid 15 in place. The sinks 153 may drain chemical solution that splashes outward during operation of the cartridge filter. Thus, chemical solution is less likely to accumulate in the pump skid 15 to thereby lengthen longevity of the pump skid 15, the pump 141, or the frame for supporting the motor 14.

According to the above description, it is appreciated that the flange 21 of the upper bracket 2 prevents deformation of the two ends of the upper bracket 2 and the pivot seats 22, thereby reliably preventing leakage of chemical solution.

Although the invention has been explained in relation to its preferred embodiment, it is to be understood that many other possible modifications and variations can be made without departing from the scope of the invention as hereinafter claimed.

What is claimed is:
1. A cartridge filter comprising:
  a tubular filter chamber with an open upper end to receive a plurality of tubular filter elements, said filter chamber being defined by a tubular wall with upper and lower end plates and comprising an upper annular groove in an outer periphery thereof,
  a top cover mounted to seal said open upper end of said filter chamber,
  a C-shaped upper bracket mounted in said upper annular groove of said filter chamber and including two ends, with a screw and a nut being provided to secure said ends of said upper bracket together, said upper bracket including a plurality of annular spaced pivot seats,
  a plurality of swivel studs each including a first end pivotally attached to one of said pivot seats, each said swivel stud further including a threaded second end and a handwheel threaded onto said threaded second end to secure said top cover in place, said upper bracket further including a flange located on a periphery of said upper bracket adjacent bases of said pivot seats to prevent deformation in said ends of said C-shaped upper bracket and said pivot seats.

2. The cartridge filter as claimed in claim 1, wherein:

said filter chamber further includes a lower annular groove in said outer periphery thereof, and a C-shaped lower bracket is mounted in said lower annular groove of said cartridge filter, said lower bracket including two ends, a second screw, and a second nut, said second screw and said second nut being provided to secure said ends of said lower bracket.

3. The cartridge filter as claimed in claim 2, wherein:

said lower bracket and said upper bracket are identical in structure, with a first one of said brackets being disposed upside-down relative to a second one of said brackets.

4. The cartridge filter as claimed in claim 1, wherein:

said filter chamber includes a plurality of cartridge core pipes mounted therein, a said tubular filter element being mounted around each said cartridge core pipe, and further comprising a dispersing tube that is in communication with a liquid inlet, said dispersing tube comprising a plurality of dispersing holes in an outer periphery thereof, such that a speed of liquid entering said cartridge is reduced before entering said filter chamber.

5. The cartridge filter as claimed in claim 4, wherein:

said dispersing tube includes an open upper end, and a tube cap is mounted on said open end of said dispersing tube.

6. The cartridge filter as claimed in claim 4, wherein:

a main frame is provided to support said filter chamber.

7. The cartridge filter as claimed in claim 6, wherein:

a base plate is mounted on top of said main frame, said filter chamber being securely mounted on top of said base plate.

8. The cartridge filter as claimed in claim 7, wherein:

a separation plate is mounted on top of said base plate and located inside said filter chamber for mounting said cartridge core pipes and said dispersing tube.

9. The cartridge filter as claimed in claim 8, wherein:

a seat is mounted on top of said separation plate, said seat including a screw hole, and said dispersing tube includes a threaded lower end that is engaged with said screw hole of said seat.

10. The cartridge filter as claimed in claim 6, wherein:

a priming cup is mounted on top of said main frame.

11. The cartridge filter as claimed in claim 10, wherein:

a pressure gauge is provided adjacent to said priming cup, said pressure gauge and said priming cup are located at a position opposite to an inlet of a pump mounted inside said main frame.

12. The cartridge filter as claimed in claim 6, wherein:

said main frame includes four legs that are inclined inward toward each other.

13. The cartridge filter as claimed in claim 6, wherein:

a pump seat is mounted inside said main frame for supporting a pump, said pump seat including a plurality of transverse ribs.

14. The cartridge filter as claimed in claim 13, wherein:

said pump seat includes a plurality of legs on each of two lateral sides thereof to provide a stable support.

15. The cartridge filter as claimed in claim 1, wherein:

said top cover includes an annular groove in an inner periphery thereof, and an annular gasket is set in said inner annular groove.

16. The cartridge filter as claimed in claim 15, wherein:

said inner annular groove of said top cover further includes an annular,groove extension, and wherein said annular gasket includes an annular protrusion that is set in said annular groove extension.

\* \* \* \* \*